This invention relates to apparatus of the rotary kiln or drum type for the heat treatment of finely divided materials at relatively low temperatures, as in the roasting and reduction of such ores as iron ore. More particularly, the invention is concerned with novel apparatus for the stated purpose, in which means are provided for improving the fuel efficiency by the recovery of heat from the combustion gases and the treated material through transfer of heat from both the gases and the treated material to the material to be treated.

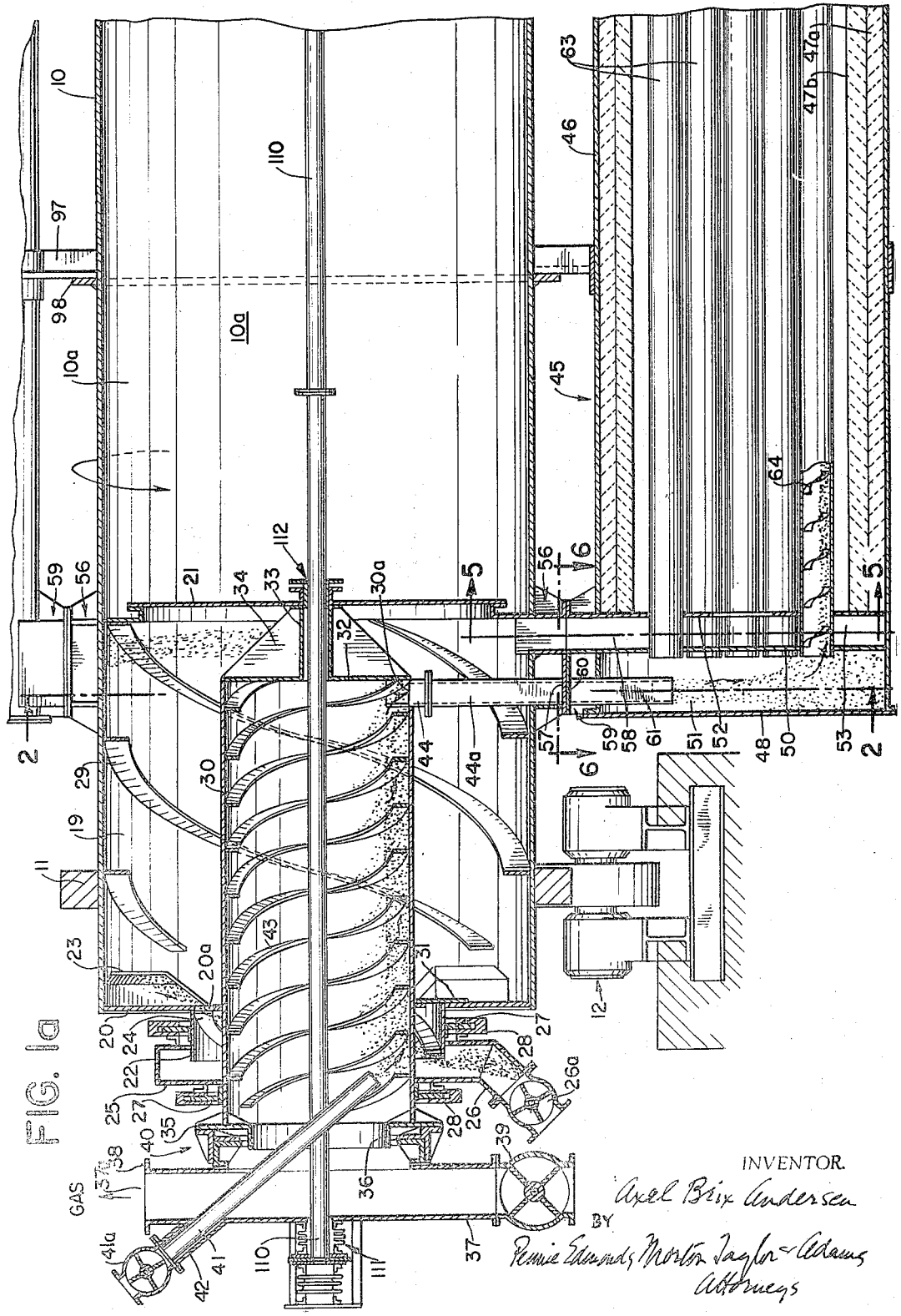

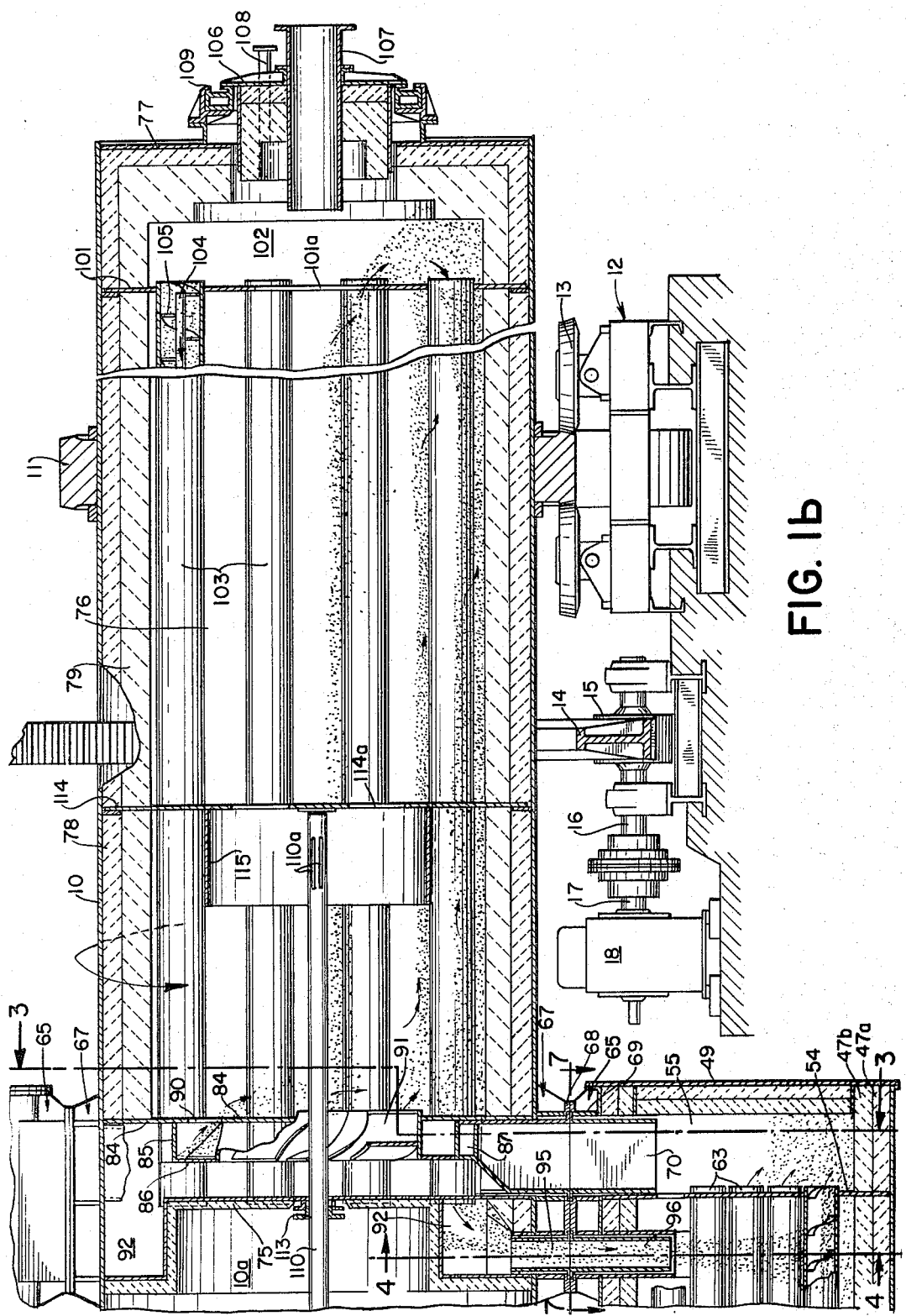

In normal rotary kiln practice, the material to be treated in the kiln, as by being burned, is fed into one end of the kiln and the fuel is introduced into the opposite end of the kiln and burned near the point of introduction. The hot combustion gases and the raw material pass through the kiln in countercurrent flow, so that the gases give up heat to the material as it approaches the burning zone and a reduction in fuel consumption is thus obtained. In order to increase the fuel efficiency, a cooler is installed beyond the kiln and the hot material discharged from the kiln is cooled by air, which is thus preheated and then used in the combustion of the fuel. A further increase in fuel efficiency may be achieved by insuring that the combustion gases give up the maximum quantity of heat possible to the incoming material and, for this purpose, the upper end of the kiln where the material is introduced, is provided with heat exchange means, such as a chain system, a quadrant system, etc. Also, the material to be treated my be preheated outside the kiln in one or more cyclone preheaters.

A common feature of conventional kilns is thus the recovery of heat from the combustion gases by direct transfer of heat from the gases to the incoming material and by transfer of heat from the treated material to the air used for combustion. Operation of a kiln with the heat recovery described is generally satisfactory, since most rotary kiln processess require the combustion of fuel at such a rate as to produce combustion gases in quantities adequate to insure the desired heat recovery. However, some rotary kiln processes are carried out at so low a temperature that the combustion gas output is too small to preheat the material fed into the kiln to the desired temperature and, when such a process is carried out in an ordinary kiln, the fuel efficiency is relatively poor.

The present invention is, accordingly, directed to the provision of a novel rotary kiln, which is provided with means for obtaining a heat recovery greater than that obtainable in a kiln equipped with the usual heat transfer means above described and may, accordingly, be employed advantageously in the treatment of finely divided materials at low temperature. A typical use of the kiln of the invention is the roasting and reduction of iron ore and, as all the desirable features of the invention are availed of in such use, a form of the kiln suitable for such a process will be illustrated and described in detail for purposes of explanation.

The new kiln for the treatment of iron ore includes a cylindrical chamber, in which the roasting and reduction operation is carried on by the combustion of fuel, and the material to be treated enters the chamber at one end and the fuel at the other. The combustion gases leaving the combustion chamber travel countercurrent to and in contact with the material to be treated on its way to the chamber, so that the gases give up heat to the incoming material by direct heat exchange. In the new kiln, the treated material does not leave the combustion chamber through the end through which the fuel is introduced, as is common in conventional kilns; instead, the treated material is caused to travel back through the combustion chamber and then travels countercurrent and in direct heat exchange relation to the raw material on its way to the chamber. For this purpose, the kiln is provided with a plurality of passageways in the combustion chamber into which the treated material is introduced at the end of the chamber, through which the fuel is supplied, and means are provided in the passageways for advancing the treated material therethrough. The kiln is also provided with a plurality of preheating chambers attached to and lying outside the kiln shell and each preheating chamber is provided with a plurality of passageways, through which the raw material passes on its way to the combustion chamber while the hot treated material passes through the preheating chambers outside the passageways in the opposite direction. The combustion gases leaving the combustion chamber enter the preheating chambers and travel in through the passageways countercurrent to the material to be treated. The use of the preheating chambers makes it possible to subdivide the treated material into a large number of streams, so that good heat transfer to the incoming material is obtained. At the same time, maintenance is facilitated, since the individual chambers can be easily detached from the kiln for servicing and replaced by others.

The end section of the kiln opposite to that, at which the combustion chamber lies, serves as a discharge chamber for the treated material and projects into a stationary discharge casing with a bottom outlet for the material. A feed chamber for the raw material is mounted to extend into the discharge chamber coaxially therewith and the outer end of the feed chamber lies within another stationary chamber having a top outlet connected to a stack. The gases leaving the passages in the preheating chambers enter the feed chamber at its inner end and travel through it countercurrent to the raw material. The gases thus give up additional heat to the raw material before the escape to the stack.

For a better understanding of the invention, reference may be made to the accompanying drawings, in which FIG. 1a is a partial view in vertical longitudinal section of a form of the new kiln suitable for the roasting and reduction of iron ore;

FIG. 1b is a view similar to FIG. 1a showing the remainder of the kiln;

FIG. 2 is a sectional view on the line 2—2 of FIG. 1a;

Figure 3:
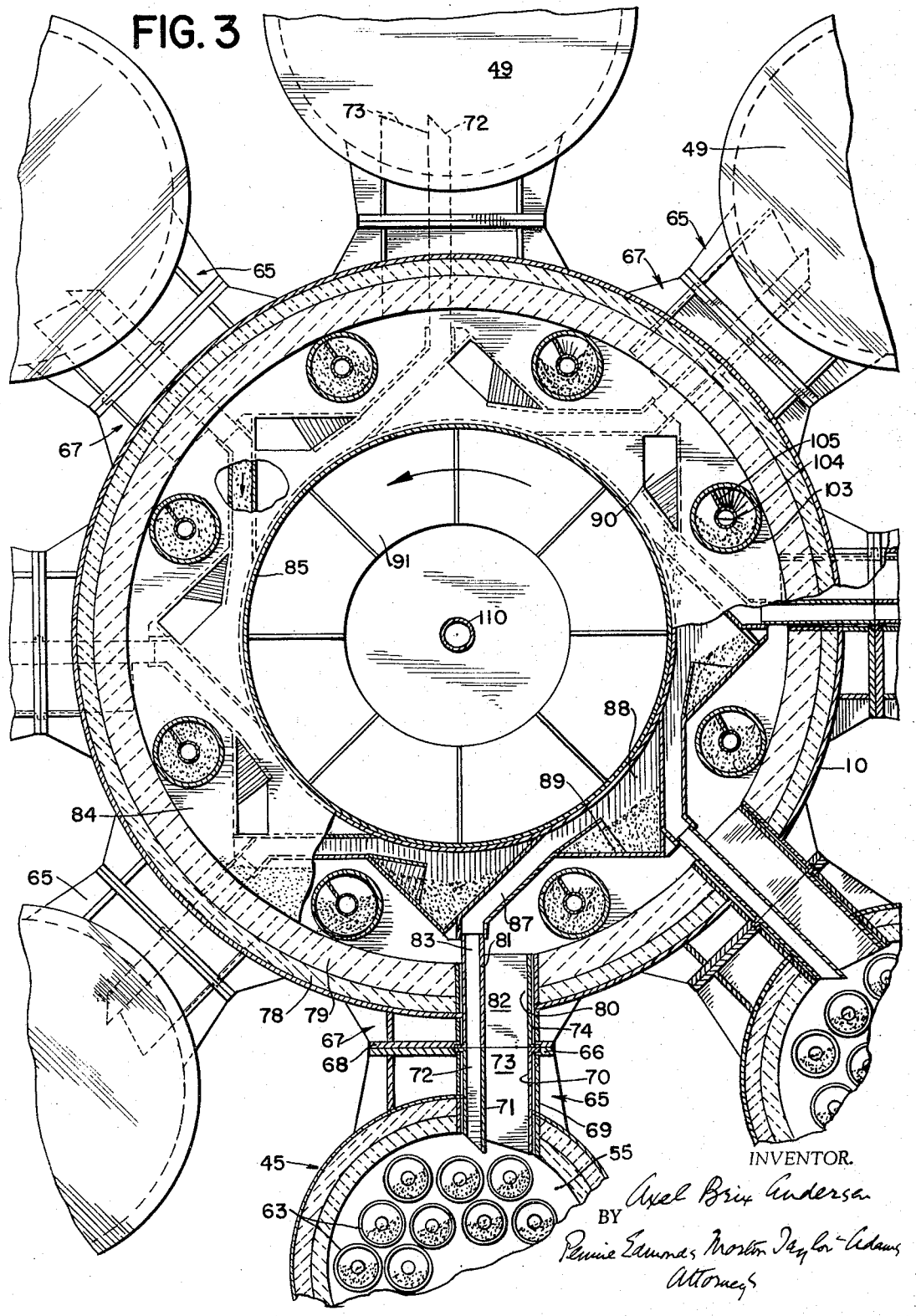
Figure 4:
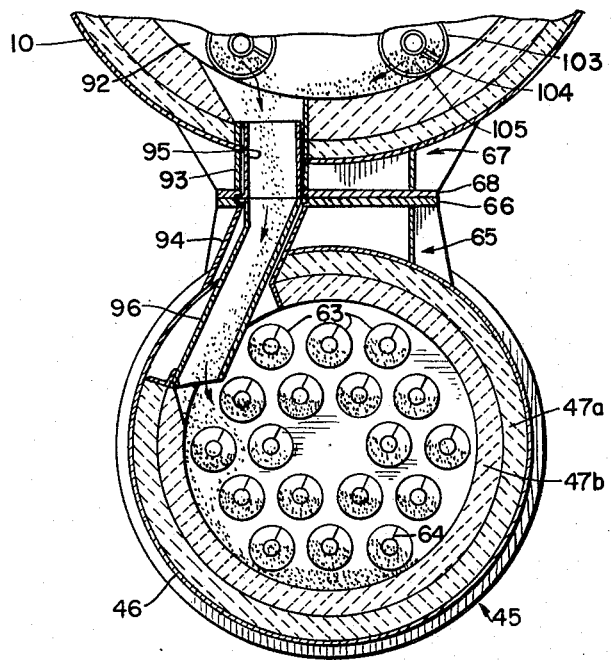
Figure 7:
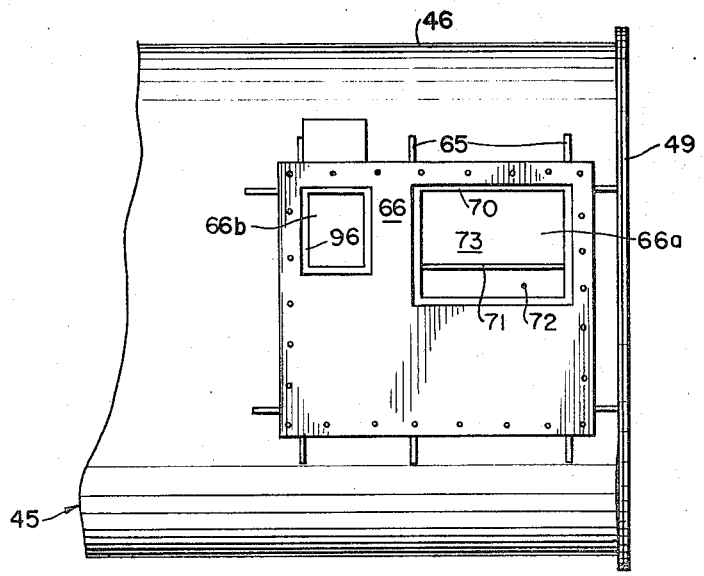
Figure 5:
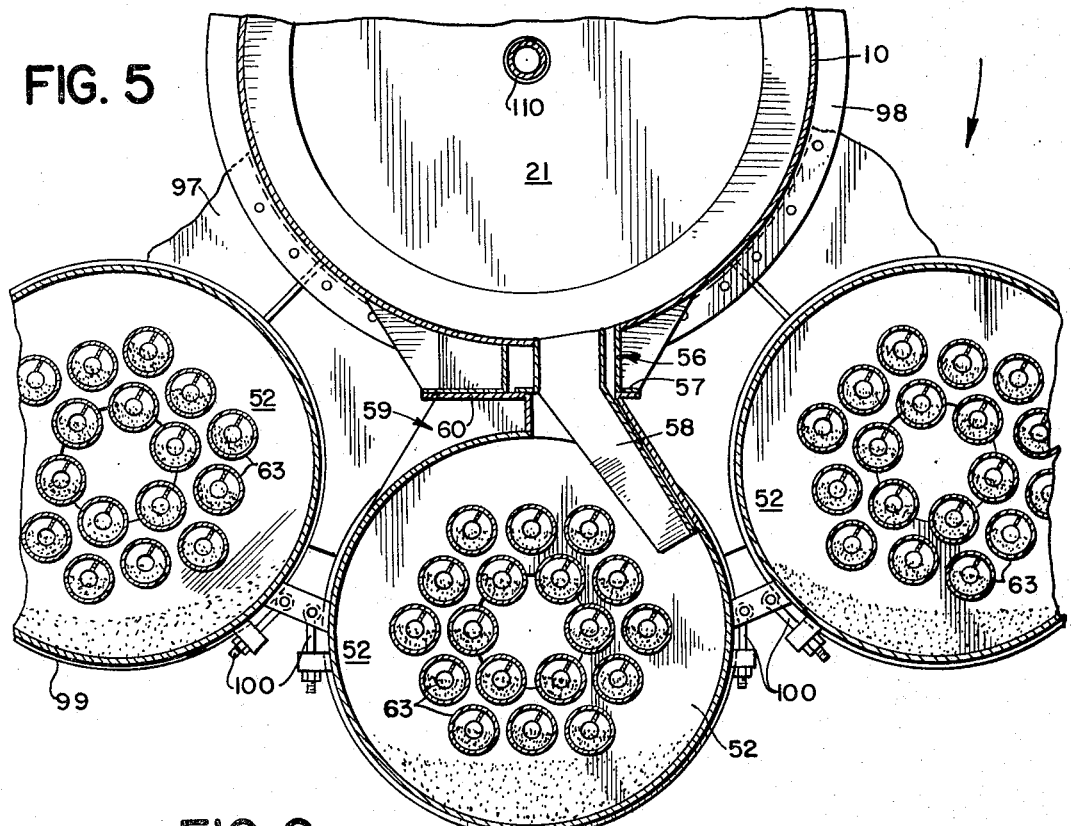
Figure 6:
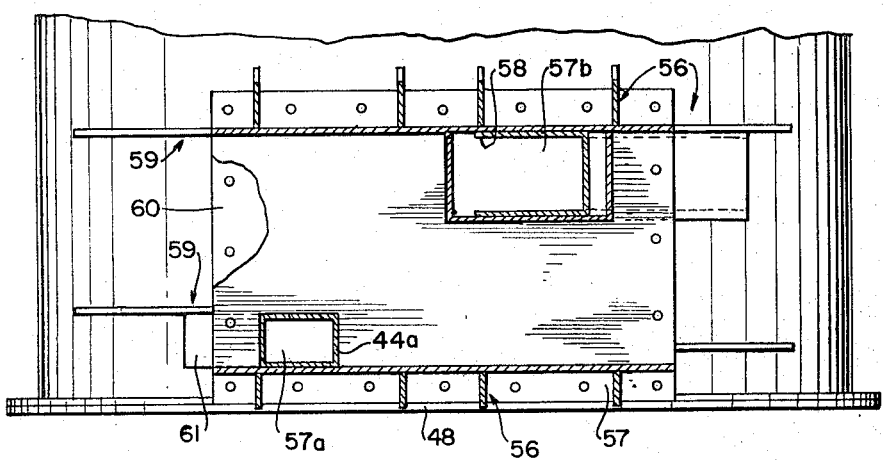

FIGS. 3 and 4 are sectional views on the lines 3—3 and 4—4, respectively, of FIG. 1b;

FIGS. 5 and 6 are sectional views on the lines 5—5 and 6—6, respectively, of FIG. 1a; and FIG. 7 is a sectional view on the line 7—7 of FIG. 1b.

The kiln shown in the drawings comprises a cylindrical shell 10 mounted for rotation about its longitudinal axis with that axis horizontal. For this purpose, the kiln is provided with tires 11 running on the usual roller supports 12, at least one of which is provided with rollers 13 for holding the kiln against endwise movement. The kiln is encircled by a conventional drive gear 14 driven by a pinion 15 mounted on the shaft 16 attached to the output shaft 17 of a speed reducing device 18.

The section of the kiln at one end (FIG. 1a) serves as a discharge chamber 19 for the treated material and the chamber is closed at its outer end by the end plate 20 of the kiln and at its inner end by a partition 21. A throat 22 concentric with the end plate 20 is attached to the outer surface of the plate and the plate is provided with openings 20a leading into the throat. Scoops 23 mounted on the inner face of the end plate 20 adjacent to each of the openings 20a act to pick up material on the bottom of the discharge chamber, as the kiln rotates, and the scoops discharge the material through the opening into the throat. The throat contains flights 24 for advancing the material through the throat and the outer end of the throat lies within a stationary casing 25 having a bottom discharge spout 26. Seals comprising flanged rings 27 encircling the throat 22 and feed chamber 30 and lying between the walls of seal castings 28 attached to the casing 25 are provided to keep the entry of air into the casing to a minimum. Material is advanced through the discharge chamber from its inner end toward the stationary casing by flights 29 attached to the inner surface of the discharge chamber wall.

A feed chamber 30 of cylindrical form extends into the discharge chamber 19 coaxially therewith through the casing 25 and an opening in the end plate 20 and the feed chamber is held in place at its outer end by a plurality of web plates 31 secured to a flange surrounding the feed chamber and to the end plate 20. The inner end of the feed chamber is closed by a plate 32, from which extends a tube 33 strengthened by web plates 34 and having an end flange connected to the end plate 21 around the opening. At its outer end, the feed chamber has an end plate 35 with an opening surrounded by a circular flange 36, which extends into a stationary casing serving as a dust chamber 37, and the dust chamber has a top outlet 37a for the escape of gas and surrounded by a flange 38 for connection to an exhaust fan or a stack. At its lower end, the dust chamber has a discharge opening leading to an air lock 39. Air is prevented from entering between the feed chamber and the casing 37 by a seal 40 of conventional construction.

Figure 2:
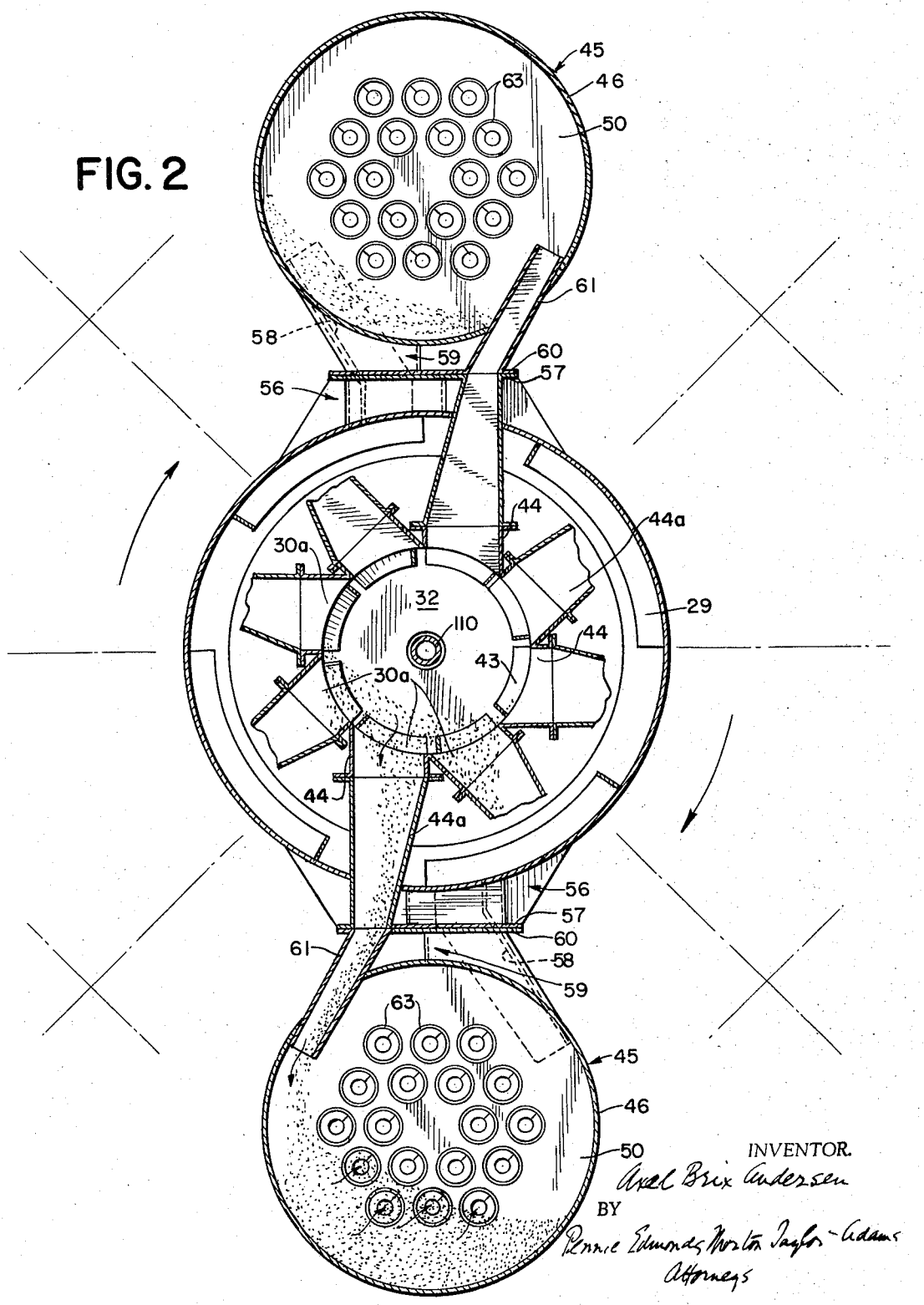

Raw material is introduced into the feed chamber 30 through a feed pipe 41 provided with an air lock 41a and mounted in a support 42 on the outer wall of casing 37. The feed pipe extends downwardly at an angle through the casing and the throat 36 and terminates within the feed chamber 30. Material introduced into the feed chamber is conveyed through the chamber by flights 43 mounted on the inner surface of the chamber and the chamber wall is provided adjacent to the end plate 32 with a plurality of openings 30a (FIG. 2), each of which is surrounded by a feed spout 44 having an encircling flange at its outer end for connection to a spout extension 44a, which passes through an opening in the wall of the shell 10.

A plurality of preheating chambers 45 (FIGS. 1a, 1b) are mounted on the exterior of the shell 10 in planetary arrangement with their axes parallel to the axis of the shell and each chamber is formed of a tubular shell 46 provided with an outer lining 47a of insulating material and an inner lining 47b of refractory material. Each shell 46 is closed at one end by an end plate 48 and, at the other, by an end plate 49, the latter being also provided with a double lining. Inward from the end plate 48, each shell 46 contains a partition 50 which with the shell and plate 48 defines a receiving chamber 51 for raw material. Inward from partition 50, there is a partition 52 defining with the shell and partition 50 a collecting chamber 53 for treated material. At the opposite end of each shell, there is an inner partition 54, which with the end plate 49 and the shell defines a collecting chamber 55 for raw material.

In the kiln illustrated, there are eight preheating chambers mounted on the shell at uniform spacings (FIGS. 2, 3) and, to support the chambers at one end, eight frames 56 are mounted at equal spacings on the outer surface of the shell adjacent to the inner end of the discharge chamber 19. Each frame has a plate 57 (FIG. 6) at its outer end and the plate has openings 57a, 57b. One of the spout extensions 44a is connected to each of the openings 57a and a discharge spout 58 is mounted in each opening 57b and has one end lying within the discharge chamber 19. Each preheating chamber 45 is provided near the end plate 48 with a frame 59 having a plate 60 at its outer end attached by bolts to the plate 57 of a frame 56 and the plate 60 has openings registering with the openings 57a, 57b. A feed spout extension 61 leads into the interior of each chamber 51 from the opening in plate 60 registering with the opening 57a in plate 57 and the discharge spout 58 projects into the interior of each preheating chamber 45 through the opening in plate 60 registering with the opening 57b in plate 57.

The raw material receiving chamber 51 is connected to the raw material collecting chamber 55 (FIG. 1b) in each preheating chamber 45 by a plurality of passageways 63 formed by tubes containing flights 64. The flights are so constructed that, when the kiln rotates in the direction of the arrow shown in FIG. 1a, material entering a passageway from the chamber 51 is advanced to the chamber 55.

At its end adjacent to the end plate 49, each preheating chamber is provided with a frame 65 provided at its outer end with a plate 66 (FIG. 7) having openings 66a, 66b. The kiln shell is provided with a frame 67 (FIG. 3) for each of the frames 65 and each frame 67 has a plate 68 attached by bolts to a plate 66 on a frame 65 and having openings registering with openings 66a, 66b through the plate 66. The frame 65 forms a spout 69 leading from the interior of the chamber 55 to the opening 66a in the plate 66 and, at its inner end, the spout terminates flush with the surface of the inner lining 47b of the chamber 45. The spout 69 contains a removable liner 70 leading from the interior of the lining 47b to the opening 66a and containing a partition 71 which subdivides the spout into a passageway 72 for material and a passageway 73 for combustion gases. The partition projects into the interior of the chamber 55 beyond the inner surface of the lining 47b and the inner end edges of the liner 70 extend to the end of the partition 54, so that, as the kiln rotates, material from chamber 53 will enter the passageway 72 but not the passageway 73.

Each frame 67 forms a spout 74 leading through the wall of the kiln shell 10 beyond a partition 75 (FIG. 1b) defining one end of a combustion chamber 76 closed at the other end by an end plate 77. The combustion chamber has an outer lining 78 of insulating material and an inner lining 79 of refractory material and the partition 75 has also an insulating lining. Each spout 74 contains a removable liner 80 registering with the liner 70 and subdivided by a partition 81 registering with the partition 71 into a combustion gas passageway 82 in communication with the passageway 73 and a passageway 83 for material registering with the passageway 72. The wall of the liner 80 and the partition are continued into the chamber 76, so that the material passageway 83 terminates inward from the surface of the lining 79 of the combustion chamber.

The combustion chamber contains an annular partition 84 near the partition 75 and the opening through the partition is encircled by a flange 85 (FIGS. 1b, 3) connecting the partition to an annular partition 86 within the combustion chamber adjacent to the end plate 75. A passageway 87 formed between the partitions 84 and 86 leads from the end of each material passageway 83 to a chamber 88 formed between the partitions 84 and 86. One wall 89 of the chamber 88 extends inward into the chamber as a prolongation of one wall of the passageway 87 and the partition 84 is formed with an opening 90 leading into the combustion chamber 76 from each chamber 88. The flange 85 contains flights 91.

The space within the combustion chamber outside the flange 85 and between the partitions 75 and 84 forms a treated material discharge chamber 92 and a discharge spout 93 (FIG. 4) for the treated material leads from the interior of the chamber 92 to the opening of each plate 68 of a frame 67 which registers with the opening 66b of the corresponding plate 66 of the frame 65 on a preheater chamber 45. The frame 65 has a corresponding spout 94 leading from the opening 66b of plate 66 through an opening in the shell 46 of the preheater chamber and the spouts 93 and 94 are provided with liners 95, 96, respectively. As the kiln rotates, treated material from the chamber 92 passes successively into the space within each preheater chamber between the partitions 52 and 54 through the aligned liners 95, 96 leading into the preheater chamber.

Between the frames 56, 59 at one end and 65, 67 at the other, each preheater chamber is mounted on saddles 97 (FIG. 5) attached to flanges 98 encircling and secured to the kiln shell. Each preheater chamber is held on its saddles by clamping bands 99 secured to the saddles by bolts 100.

The combustion chamber 76 contains a partition 101 with a central opening 101a spaced from the inner lining for the end plate 77 to provide a collecting chamber 102 for the treated material and each of the partitions 84 and 101 has a circular series of openings lying close to the inner surface of lining 79 of the combustion chamber. The openings in the two partitions are in alignment and a tube 103 is mounted in each pair of aligned openings. Each tube contains an axial filler pipe 104 and flights 105 extending between the pipe and the inner surface of the tube. The flights are arranged to cause material entering the tubes from the chamber 102 to travel through the tubes and be discharged into the chamber 92.

The end plate 77 of the combustion chamber has an opening through which projects a portion of a stationary casing 106 supporting an inlet pipe 107 for the fuel and a pipe 108 for air, if the fuel is a reducing gas. The stationary casing is sealed to the end plate 77 by a conventional seal 109 and the casing may have an observation port, if desired.

A tube 110 for the admission of secondary air for combustion extends through the discharge casing 37 and is sealed thereto by a conventional seal 111. The tube continues through the feed chamber 30, the pipe 33, and the section 10a of the shell 10 between the partitions 21 and 75. The tube 110 is sealed in the tube 33 by a conventional seal 112 and projects through another conventional seal 113 and an opening in partition 75 to terminate adjacent to a partition 114 in the combustion chamber adjacent to the partition 84. The tube 110 is formed near its inner end with outlet openings 110a and the portion of the tube containing the openings lies within a circular flange 115 attached to the partition 114 to encircle a circular series of openings 114a through the partition.

In the operation of the kiln described, the raw material to be treated is fed into the feed chamber 30 through the feed pipe 41 and is advanced through the chamber by the flights 43 and discharged through the discharge spouts 44 with their extensions 44a and the spouts 61 into the feed chambers 51 at the adjacent ends of the respective preheater chambers 45. The material is then advanced through the tubes 63 in the preheater chambers by the flights 64 in the tubes and enters the collecting chamber 55 at the opposite ends of the preheater chambers. From the collecting chamber 55 of each preheater chamber, the material travels through the connected passages 72, 83, and 87 into a chamber 88 in the combustion chamber 76 and, as the kiln rotates, the material is prevented by the wall 89 from returning through the connected passages and escapes through an opening 90 into the interior of the combustion chamber inward from the partition 94. During the rotation of the kiln, the tubes 103 in the combustion chamber act as lifters for the material and the material is advanced through the combustion chamber and enters the discharge chamber 102. Return flow of the material from the combustion chamber through the partition 84 is prevented by the flights 91.

During the passage of the material through the combustion chamber, it is first heated by the final combustion of the fuel with the secondary air in the space between partitions 84 and 114 and, as the material continues through the combustion chamber, it is reduced by the action of the incompletely burned fuel in the zone of the combustion chamber between partition 114 and the end plate 77.

The material traveling through the combustion chamber spills through the central opening 101a in the partition 101 into the collecting chamber 102 and then enters the tubes 103. The material is advanced through the tubes by the flights 105 therein and the material and the filler pipe 104 in each tube fill the tube so that combustion gas is prevented from traveling through the tubes with the material. The gas, accordingly, leaves the combustion chamber through the central openings through the partitions 84 and 86 and travels through the passageways 82 and 73 to enter the raw material collecting chambers 55 in the respective preheater chambers 46. The treated material discharged from the tubes 103 enters the discharge chamber 92 and travels through the passageway formed by the aligned liners 95, 96 in the spouts 93, 94 to enter the respective preheater chambers between the partition 52 and 54 therein. The rotation of the kiln causes the material to travel through each preheater chamber outside the tubes 63 and to be discharged through the discharge spout 58 of that chamber and the aligned opening 57b into the chamber 19. The treated material entering the chamber 19 is advanced through that chamber by the flights 29 and lifted into the throat 22 by the scoops 23. The material issuing from the throat enters the stationary casing 25 and is discharged therefrom through the bottom discharge spout 26. Meanwhile, the gas travels through the tubes 63 in the respective preheater chambers countercurrent to the raw material passing through the tubes and the gas from each chamber escapes through the connected feed spouts 61, 44, and 44a leading from that chamber and enters the raw material feed chamber 30. The gas escapes through the flange 36 and enters the stationary casing 37 where it leaves through the top outlet 37a and travels to the stack.

In a kiln embodying the invention, the incoming raw material on its way to the combustion chamber is preheated in the preheater chambers mainly by indirect heat transfer from the treated material and also by direct heat transfer from the combustion gas. The travel of the raw material through the preheater chambers in the form of a plurality of relatively small streams confined by the tubes 63, while the hot material travels countercurrent through the chambers outside the tubes, insures good solids-to-solids heat exchange and, similarly, the travel of the gas through the tubes countercurrent to the raw material effects a good heat recovery from the gas. The use of the several preheater chambers simplifies maintenance problems since, if any chamber requires maintenance, it can be removed from the kiln without difficulty by releasing the clamping bands and unbolting the connections between the frames on the kiln and those on the chamber. Another chamber can then be quickly placed in position so that the kiln can continue in operation while the chamber removed is being repaired.

The interior of the section of the kiln shell between the partition 21 at the inner end of the discharge chamber 19 and partition 75 at the inner end of the combustion chamber 76 is ordinarily the most inaccessible part of the kiln, since it is impractical to provide access openings through the shell and its linings. In the new kiln, the interior of this section of the kiln is not utilized in the treatment of the raw material or the recovery of heat but the section acts as a connection between the discharge chamber 19 at one end and the combustion chamber 76 at the other. Accordingly, all parts of the interior of the kiln shell are readily accessible.

I claim:

1. An apparatus for the heat treatment of finely divided material which comprises a generally cylindrical shell mounted for rotation on its longitudinal axis with that axis substantially horizontal, means for rotating the shell, means at one end of the shell defining a feed chamber for the introduction of raw material and the discharge of combusion gas and a discharge chamber for treated material, the chambers being telescoped and coaxial, means at the other end of the shell defining a combustion chamber, a plurality of preheater chambers mounted on the outside of the shell in planetary arrangement between the telescoped chambers and the combustion chamber, connections through the shell wall between the feed and discharge chambers and each preheater chamber at one end of the latter for the travel of raw material to and combustion gas from the preheater chamber and for the travel of treated material from the preheater chamber, respectively, connections through the shell wall between the combustion chamber and each preheater chamber at the other end of the latter for the travel of raw material to and combustion gas from the combustion chamber and for the travel of treated material from the combustion chamber, respectively, means in each preheater chamber defining passages for the countercurrent travel of the raw material and gas, the treated material traveling in bulk through each preheater chamber outside the passages countercurrent to the raw material and in indirect heat exchange relation thereto, means in the combustion chamber defining passages for the travel of treated material back through the chamber from the outer end thereof, the raw material traveling in bulk through the combustion chamber outside the passages toward the outer end of the chamber, and means for introducing a reducing fuel mixture into the combustion chamber.

2. The apparatus of claim 1, in which the feed chamber lies within the discharge chamber and parts of the feed and discharge chambers extend out of the shell, the part of the feed chamber outside the shell lying farther from the shell than the part of the discharge chamber outside the shell.

3. The apparatus of claim 2, in which the parts of the feed and discharge chambers outside the shell lie within stationary casings, the casing for the feed chamber having outlets for gas and dust, respectively, and the casing for the discharge chamber having an outlet for treated material.

4. The apparatus of claim 3, in which a feed pipe for raw material enters the outer end of the feed chamber through the stationary casing for that chamber.

5. The apparatus of claim 1, in which a pipe for secondary air extends through the fed and discharge chambers and the shell to terminate within the combustion chamber near the inner end thereof.

6. The apparatus of claim 1, in which the means for introducing a reducing fuel mixture into the combustion chamber includes a pipe extending into the chamber through its outer end.

7. The apparatus of claim 1, in which the means defining passages in each preheater chamber include tubes mounted in partitions in the chamber spaced inward from its ends and the tubes contain flights for advancing material therethrough.

8. The apparatus of claim 7, in which the connections to the discharge chamber from each preheater chamber lead from the space around the tubes in the preheater chamber.

9. The apparatus of claim 1, in which each preheater chamber has partitions at one end partly defining a collecting chamber for treated material and a receiving chamber for raw material.

10. The apparatus of claim 9, in which the preheater chamber has a partition at the other end partly defining a collecting chamber for raw material.

11. The apparatus of claim 9, in which connections for combustion gas conduct the gas from the interior of the combustion chamber into the raw material collecting chambers of the respective preheater chambers.

12. The apparatus of claim 10, in which the passages in each preheater chamber connect the receiving and collecting chambers for raw material in the preheater chamber.

13. The apparatus of claim 9, in which the connections between the feed chamber and each preheater chamber lead into the raw material receiving chamber in the preheater chamber.

14. The apparatus of claim 1, in which the means in the combustion chamber for travel of treated material back through the chamber include pipes containing flights for advancing material therethrough.

15. The apparatus of claim 1, in which the combustion chamber contains partition means at its inner end defining a discharge chamber for treated material and a plurality of chambers for receiving raw material from the respective preheater chambers.

16. The apparatus of claim 15, in which the combustion chamber contains a partition inward from its outer end partly defining a collecting chamber for treated material.

17. The apparatus of claim 16, in which the passages for movement of treated material back through the combustion chamber extend between the collecting and discharge chambers for treated material and the receiving chambers for raw material discharge into the space within the combustion chamber outside the passages.

18. The apparatus of claim 15, in which each preheater chamber includes a discharge chamber for raw material and a connection extends between such discharge chamber and one of the receiving chambers in the combustion chamber.

19. The apparatus of claim 15, in which connections for treated material conduct the material from the treated material discharge chamber in the combustion chamber into each preheater chamber outside the passages therein.

No references cited.

JOHN F. CAMPBELL, *Primary Examiner.*
R. F. DROPKIN, *Examiner.*